US012104141B2

(12) United States Patent
Kaiserman et al.

(10) Patent No.: US 12,104,141 B2
(45) Date of Patent: Oct. 1, 2024

(54) PRINTABLE SURFACTANT COMPOSITE

(71) Applicant: Vitiprints, LLC, New York, NY (US)

(72) Inventors: Terrance Kaiserman, Loxahatchee, FL (US); Andrew Ferber, New York, NY (US); John Gentile, Montclair, NJ (US); Bao Tran, Bensalem, PA (US); Clifton Fearon, Union, NJ (US); Dmytro Konovalov, Brooklyn, NY (US); Maria Colli, New York, NY (US)

(73) Assignee: Vitiprints, LLC, New York, NY (US)

( * ) Notice: Subject to any disclaimer, the term of this patent is extended or adjusted under 35 U.S.C. 154(b) by 118 days.

(21) Appl. No.: 17/130,893

(22) Filed: Dec. 22, 2020

(65) Prior Publication Data

US 2021/0189301 A1 Jun. 24, 2021

Related U.S. Application Data

(60) Provisional application No. 62/952,594, filed on Dec. 23, 2019.

(51) Int. Cl.

| | |
|---|---|
| ***C11D 17/00*** | (2006.01) |
| ***C11D 1/83*** | (2006.01) |
| ***C11D 3/22*** | (2006.01) |
| ***C11D 3/37*** | (2006.01) |
| ***C11D 3/40*** | (2006.01) |
| ***C11D 17/06*** | (2006.01) |
| ***G09F 3/02*** | (2006.01) |

(52) U.S. Cl.

CPC ............ *C11D 17/0052* (2013.01); *C11D 1/83* (2013.01); *C11D 3/222* (2013.01); *C11D 3/3753* (2013.01); *C11D 3/40* (2013.01); *C11D 17/0039* (2013.01)

(58) Field of Classification Search

None

See application file for complete search history.

(56) References Cited

U.S. PATENT DOCUMENTS

| | | | |
|---|---|---|---|
| 5,869,437 | A | 2/1999 | Wolfersberger |
| 10,347,158 | B2 | 7/2019 | Amron |

(Continued)

OTHER PUBLICATIONS

KR 20160121872 A (Year: 2016) with English Translation.*

*Primary Examiner* — Lorna M Douyon

(74) *Attorney, Agent, or Firm* — Lerner David LLP

(57) ABSTRACT

A dissolvable surfactant composite according to the present technology is configured to provide a waste-free flexible and durable composite article useful for various single use applications, including as a single-use image bearing article. The dissolvable surfactant composite may have at least a dual capability, such that when the composite article is no longer needed, the dissolvable surfactant composite may readily dissolve and wash away upon application of water or other liquid solution, such that generation of waste that must be disposed of as trash or through traditional recycling processes is avoided. In some aspects the dissolvable surfactant composite may be adapted to provide cleaning compositions for different applications upon dissolution. Thus, in such aspects, the dissolvable surfactant composite not only avoids waste generation, but may also provide dual utility as both a composite article, as well as a cleaning solution.

10 Claims, 4 Drawing Sheets

(56) References Cited

U.S. PATENT DOCUMENTS

| | | | | |
|---|---|---|---|---|
| 2008/0242572 | A1* | 10/2008 | Icht | C11D 17/06 510/147 |
| 2011/0023240 | A1* | 2/2011 | Fossum | C11D 3/222 510/331 |
| 2011/0028373 | A1* | 2/2011 | Fossum | C11D 17/00 510/236 |
| 2011/0182956 | A1* | 7/2011 | Glenn, Jr. | A61K 8/416 424/70.13 |
| 2017/0352299 | A1* | 12/2017 | Amron | G09F 3/02 |
| 2018/0223230 | A1* | 8/2018 | Tan | C11D 17/044 |
| 2019/0194584 | A1 | 6/2019 | Astete Boettcher | |
| 2020/0308517 | A1* | 10/2020 | Tan | B32B 3/02 |
| 2021/0163698 | A1* | 6/2021 | Mac Namara | C11D 17/06 |
| 2021/0387444 | A1* | 12/2021 | Knight | C08J 5/18 |

* cited by examiner

PRINTABLE SURFACTANT COMPOSITE

CROSS-REFERENCE TO RELATED APPLICATION

This application claims the benefit of the filing date of U.S. Provisional Patent Application No. 62/952,594, filed Dec. 23, 2019, the disclosure of which is hereby incorporated herein by reference.

BACKGROUND OF THE INVENTION

Aspects of the present technology relate, in general, to a multi-layered dissolvable surfactant composite including at least a readily dissolvable surfactant substrate and, in some embodiments, a wear layer and/or a printed image, picture, text, or other indicia. In some embodiments, the surfactant composite may be formed as a sign, a poster, a card, a label, etc.

Single use articles are widely used across many industries and for many diverse applications. For example, in the hospitality and travel industries, single use cards, brochures, pamphlets, maps, tickets, and the like are used and distributed regularly. In the personal care industry, single use, individually packaged soaps, cleansers, wipes and other products are well known. Similarly, in the retail industry, single use packaging, sticker, labels, price tags, and receipt paper are ubiquitous and necessary products for conducting daily business. As a particular example, signs bearing product descriptions and pricing are routinely used throughout stores and then disposed of when changes in stock or pricing occur. Typically, such articles are made from paper, cardboard, or plastic laminate based materials.

While such single use articles are a useful and important product in many industries, single use articles (and/or their packaging) made of conventional materials are disposed of as trash after use, resulting in the production of large amounts of waste in the course of daily business. While some paper materials may be recyclable through traditional methods, this necessitates separating recyclable materials and delivering them to an appropriate recycling facility which may become costly in both time and money, especially when large amounts of waste material are generated regularly.

BRIEF SUMMARY OF THE INVENTION

A dissolvable surfactant composite according to the present technology may be adapted to provide a waste-free flexible and durable article useful for various single use applications. In some embodiments, the dissolvable surfactant composite may provide an image-bearing article. When the single-use article is no longer needed, the dissolvable surfactant composite of the present technology may be configured to readily dissolve and wash away upon application of water, such that generation of waste that must be disposed of as trash or through traditional recycling processes is avoided. In some aspects the dissolvable surfactant composite may be adapted to provide cleaning compositions for different applications upon dissolution. Thus, in such aspects, the dissolvable surfactant composite may not only avoid waste generation, but may also provide dual capability as both a single-use article, as well as a cleaning solution.

DETAILED DESCRIPTION

In describing aspects of the present invention(s), specific terminology will be used for the sake of clarity. However, the invention(s) is not intended to be limited to any specific terms used herein, and it is to be understood that each specific term includes all technical equivalents, which operate in a similar manner to accomplish a similar purpose.

As used in the present application, "cold water" refers to water within the range of about 0° C. to about 20° C., "room temperature water" refers to water within the range of about 21° C. to about 25° C., "warm water" refers to water within the range of about 30° C. to about 40° C., and "hot water" refers to water within the range of about 41° C. to about 100° C. The same temperature ranges apply when the adjectives "cold", "room temperature", "warm", and "hot" are applied to other aqueous or nonaqueous solutions, aside from pure water.

As used in the present application, "dissolvable" means capable of dissolution in cold, room temperature, or warm water or other aqueous or nonaqueous liquid solutions within at least 60 seconds, where no stirring, agitation, or physical friction is necessary for such dissolution.

Dissolvable Surfactant Composite

Figure 1A:
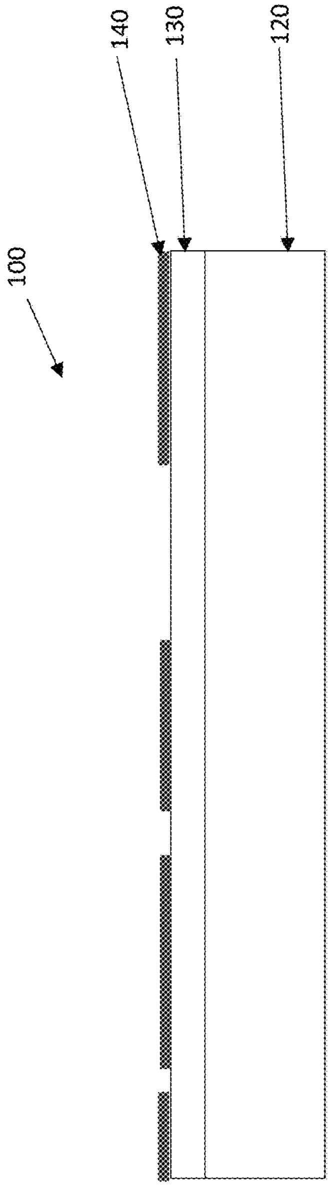
FIG. 1A depicts a cross-sectional view of a dissolvable surfactant composite according to aspects of the present technology.
Figure 1B:
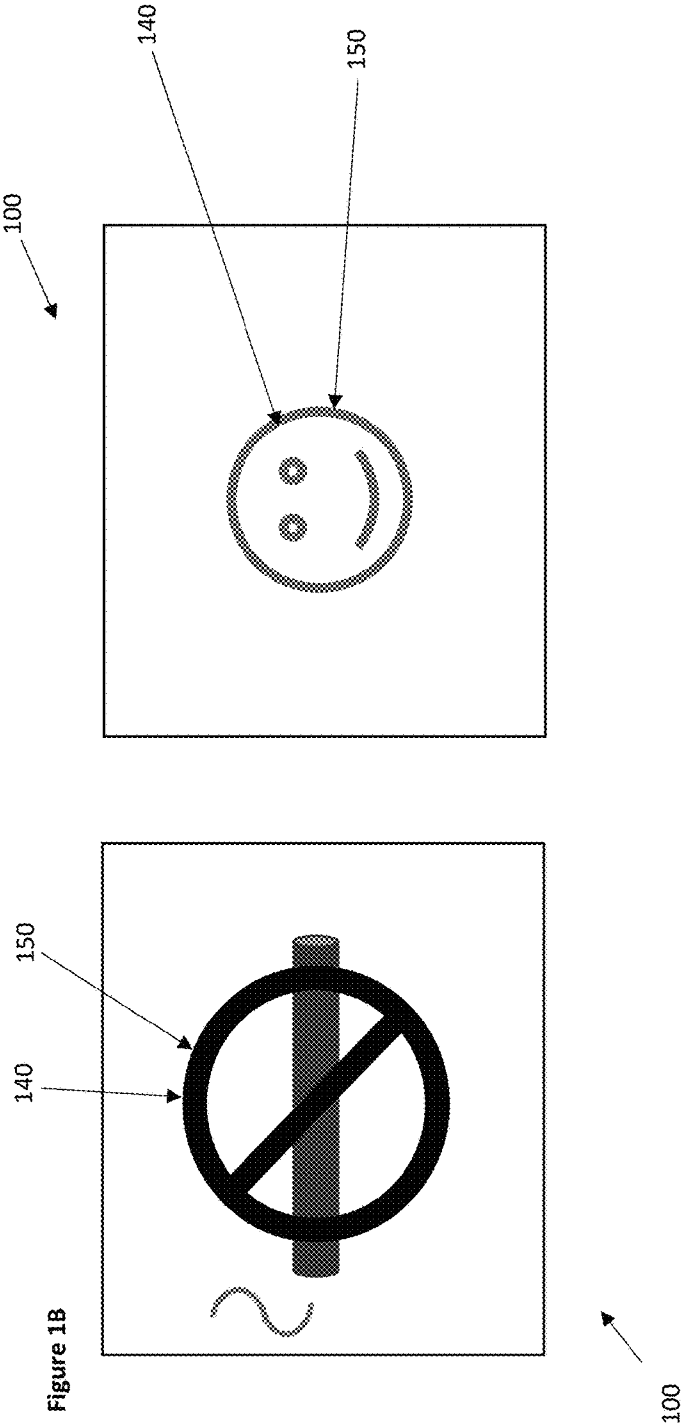
FIG. 1B depicts a top-down view of a dissolvable surfactant composite according to aspects of the present technology.

A dissolvable surfactant composite according to one embodiment of the present technology is shown in FIGS. 1A-B. In one embodiment, the dissolvable surfactant composite may include at least three layers: a surfactant layer, a wear layer, and an image layer. In such an embodiment, the surfactant layer may be disposed on one surface of the wear layer and the image layer may be disposed on an opposing surface of the wear layer such that the wear layer may be sandwiched between, and may separate, the surfactant layer and the image layer. A dissolvable surfactant composite according to the present technology may be configured to have at least a dual capability. That is, the dissolvable surfactant composite may be configured to have a first capability prior to dissolution and at least a second capability after dissolution in water or other solution.

In some aspects, the surfactant layer may be a porous solid substrate, which has a high porosity, such that it dissolves readily and quickly when placed in water or another aqueous or non-aqueous liquid. In some embodiments, the dissolvable surfactant composite may comprise only a single surfactant layer with a single composition, while in other embodiments, two or more surfactant layers may be included, each having a distinct composition.

In some aspects, the wear layer may comprise a dissolvable polymer film. In some aspects, the wear layer may be configured to provide mechanical strength and durability to the composite and to prevent spontaneous degradation of the surfactant layer prior to its being dissolved in water or other solution. Accordingly, the wear layer may be configured to dissolve at a slower rate or less readily than the surfactant layer. However, the wear layer may simultaneously be capable of readily dissolving when placed in cold, room temperature, warm, or hot water. To facilitate dissolution, the polymer film may be a porous film or may be a thin film, having a thickness less than about 10 microns.

In some embodiments, the dissolvable polymer film may comprise polyvinyl alcohol, polyethylene oxide and/or polyvinyl acetate, while in other embodiments, the dissolvable polymer film may comprise one or more polymers derived from natural materials such as for example, alginates, pullulan, oatmeal, acerola, carboxylated pullulan, guar gum, xanthum gum, acacia gum, gum arabic, tragancanth gum, carboxylated scleroglucan, and banana. In some aspects, the wear layer is adapted to provide a favorable surface for printing of the image layer, such that crisp clear images may be produced and maintained, while ink migration or bleeding is reduced or eliminated.

In some aspects, the image layer is a layer of printed ink, dye, pigment, or the like, which forms an image, picture, message, slogan, or any other indicia. In an embodiment, the ink used in the printed image layer is configured to interact with the wear layer so that clear images are produced and ink migration is minimized or eliminated.

While one embodiment of the dissolvable surfactant composite may comprise at least a surfactant layer, a wear layer, and an image layer, other embodiments may include alternative combinations of some of these layers, all of these layers, two or more iterations of some or all of the described layers, and/or additional layers. For example, in an embodiment, the image layer may be printed directly on a surface of the surfactant layer, without the use of an intervening wear layer between them. In another embodiment, the dissolvable surfactant composite may comprise a wear layer and at least one surfactant layer, but may lack an image layer. In still another embodiment, the dissolvable surfactant composite may contain at least two wear layers, with a surfactant layer disposed in between the two wear layers. In further embodiments, additional layers may be used, such an adhesive layer or a magnetic layer.

Surfactant Layer(s)

As shown in FIG. 1A, in one embodiment, the surfactant layer is a porous solid substrate including at least one layer comprising a surfactant and a film former, and optionally, other additives.

The surfactant is not particularly limited and may be any one or more of an anionic surfactant, a cationic surfactant, an amphoteric surfactant, a non-ionic surfactant, or any mixture therein. The surfactant may be chosen and formulated based on the desired post-dissolution capability. For instance a surfactant configured to provide a cleaning solution for a textile may be formulated differently than a surfactant that is adapted to clean windows or floors.

Suitable anionic surfactants include, for example, alkyl and alkyl ether sulfates, sulfated monoglycerides, sulfonated olefins, alkyl aryl sulfonates, primary or secondary alkane sulfonates, alkyl sulfosuccinates, acyl taurates, acyl isethionates, alkyl glyceryl ether sulfonate, sulfonated methyl esters, sulfonated fatty acids, alkyl phosphates, acyl glutamates, acyl sarcosinates, alkyl sulfoacetates, acylated peptides, alkyl ether carboxylates, acyl lactylates, anionic fluorosurfactants, sodium lauroyl glutamate, and any combination of species therein. Preferred anionic surfactants are phosphate esters, sodium lauryl sulfate, and sodium tridecyl ether sulfate.

Appropriate non-ionic surfactants include, for example, ethoxylated linear alcohols, ethoxylated alkyl phenols, fatty acid esters, amine- and amide-byproducts, ethylene-oxide copolymers, propylene oxide and ethoxylated polyalcohols, any other compatible non-ionic surfactant species, and any combination of species therein. Preferred non-ionic surfactants are laureth acid and ethoxylated polyalcohols.

Suitable cationic surfactants include, for example, ethoxylated linear alcohols, ethoxylated alkyl phenols, fatty acid esters, amine- and amide-byproducts, ethylene-oxide copolymers, propylene oxide, ethoxylated polyalcohols, and any combination of species therein. A preferred cationic surfactant is an ethoxylated amine.

Amphoteric surfactants include, for example, sodium 3-dodecyl-aminopropionate, sodium 3-dodecylaminopropane sulfonate, sodium lauryl sarcosinate, N-alkyltaurines, N-higher alkyl aspartic acids, and any combination of species therein.

In a preferred embodiment, the surfactant is a combination of at least one anionic surfactant and at least one nonionic surfactant. The surfactant may be included in an amount ranging from 0.5% to 90% by weight of the surfactant layer, more preferably about 30% to about 80%, and most preferably about 40% to about 70%. The amount of surfactant may be selected based on the desired capability after dissolution. For example, a dissolvable surfactant composite configured for a post-dissolution capability of window cleaning may contain a smaller amount of surfactant in the surfactant layer, so no streaks are left on a window. Conversely, for example, a dissolvable surfactant composite configured for a post-dissolution capability of providing a laundry detergent may contain a larger amount of surfactant in order to loosen grease and dirt in clothing fibers.

Any suitable film former may be used such as polyethylene oxide, a polysaccharide, a polyvinyl alcohol, or any mixture thereof. In a preferred embodiment, the film former may comprise a polyvinyl alcohol. The film former may be included in an amount ranging from 0.5% to 60% by weight of the surfactant layer, more preferably about 2% to about 30%, and most preferably about 10% to about 20% by weight of the surfactant layer.

Various additives may also be included within the surfactant layer, including: foaming or defoaming agents; optical brighteners; UV absorbers; colorants of all types such as pigments or dyes including colors that turn colorless upon drying or heating; fluorescent or reflective components such as mica flakes, polyester and aluminum flakes; waxes of all types; antimicrobials of all types; emulsifiers of all types; plasticizers of all types, such as glycerin, glycols, etc.; bacteria, enzymes, or other microbes capable of assisting in dissolution and breakdown of waste and other deposits which may be present on pipes, drains, and other surfaces; fibers such as oat, tapioca, microcellulose, glass, etc.; various moisture absorbing desiccants and other absorbing, adsorbing ingredients; zeolites and other products that have a known porosity to absorb different particulates from the air and surrounding environments; anti-stat and static ingredients to repel a static charge or to keep a static charge; magnetic matter to accept a magnetic ingredient; fragrances of all types; a bittering agent as a deterrent for ingestion, such as accidental ingestion by children; blowing agents of all types; gloss promoting ingredients or matte promoting ingredients to adjust surface gloss; reflective ingredients for light, heat, or UV, such as, for example, glass beads to be light reflective; photochromic and thermochromic ingredients; glow in the dark ingredients; coefficient of friction agents to promote a controlled surface dyne when dissolved and applied as a soap or polish on a floor or other substrates; pumice or grits of all sizes; suspending agents for suspending particles in low viscosity liquids; pipe cleaning ingredients and toilet bowl cleaners; bathroom cleaners and other household cleaners; plant based ingredients and non-plant based ingredients; ink degrading surfactants to break up and disperse non water soluble inks; rehydrating ingredients; leveling agents; microencapsulated ingredients of all types; ice melting sheets; temporary adhesives and permanent adhesives—water soluble, alcohol soluble, solvent soluble etc.; dyes used for textiles for tie dye, dipping, submersion, sintering etc.; all plant based ingredients or non-plant based ingredients; marble cleaning and oil absorbing compounds; antioxidants of all types; and any combination therein.

A total amount of additives may be included in an amount ranging from about 0.001% to about 90%, more preferably from about 0.5% to about 50%, most preferably from about 0.5% to about 25%, by weight of the surfactant layer.

In some aspects, the surfactant layer may have a porosity or void fraction within the percentage range of about 0.001% to about 90%, more preferably about 1% to about 80%, and most preferably about 5% to about 75%. The porosity of the surfactant layer may allow for rapid dissolution of the surfactant layer when it is placed in water. If the porosity of the surfactant layer is less than 0.5%, more preferably less than 1%, or most preferably less than 5%, the surfactant layer may fail to readily dissolve in water. Conversely, if the porosity of the surfactant layer is greater than 90%, more preferably greater than 80%, or most preferably greater than 75%, the surfactant layer may fail to provide sufficient strength, flexibility, and/or stability, such that it may be prone to tearing, bending, ripping, or dissolution when handled and exposed to ambient air and the outside environment.

In some embodiments, such as depicted in FIG. 1A, the surfactant layer may be a single surfactant layer with a single composition. The composition of the single surfactant layer may be configured to provide a cleaning solution with a single capability when dissolved in water, such as a window cleaning solution. Conversely, the single surfactant layer may be configured to provide multiple or all-purpose capability, such as providing an all-purpose cleaner or such as providing a combined floor and drain cleaner when dissolved in water.

Figure 2:
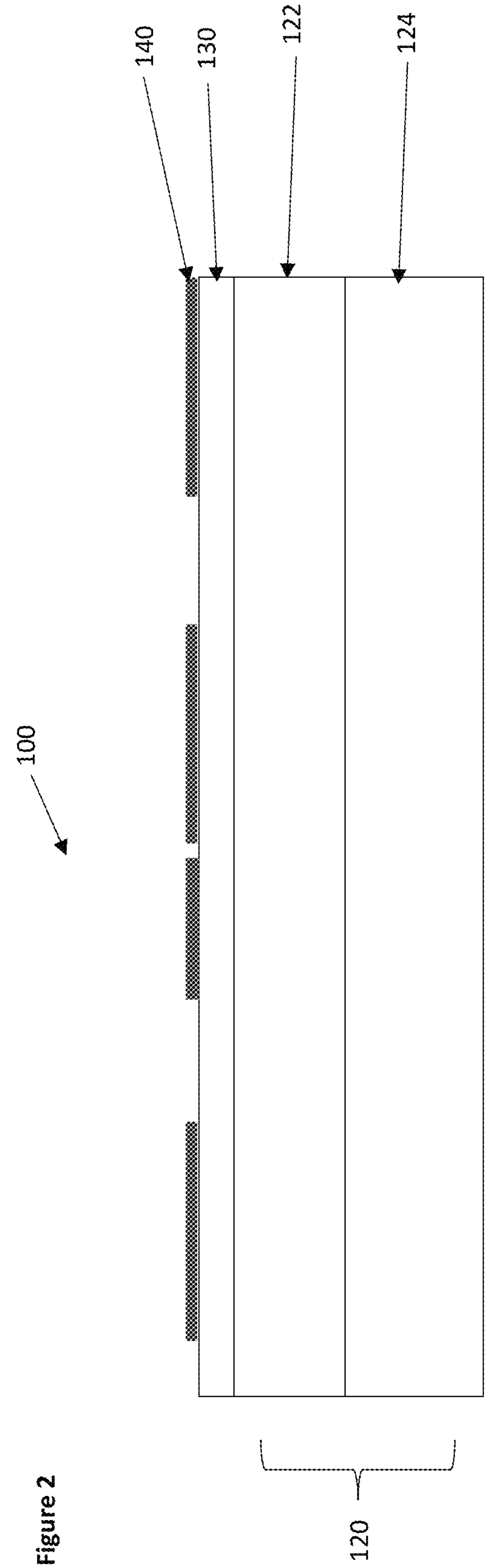
FIG. 2 depicts a cross-sectional view of a dissolvable surfactant composite according to aspects of the present technology.

In alternative embodiments, such as depicted in FIG. 2, the surfactant layer may comprise two or more surfactant layers, each with a distinct composition. For example, the surfactant layer may comprise a first surfactant layer configured to provide floor cleaning capability when dissolved in water and a second surfactant layer configured to provide drain or pipe cleaning capability. In such an embodiment, the second surfactant layer may have a composition which is distinct from a composition of the first surfactant layer. For example, the second surfactant layer configured to provide drain or pipe cleaning capability may include microbial additives which are capable of assisting in breakdown and dissolution of waste and material contributing to fouling of drains or pipes. Conversely, the first surfactant layer configured to provide floor cleaning capability may lack the microbial additives of the second surfactant layer, but may include pumice or other granular additives which are configured to assist in the scrubbing of floors. Similarly, in an embodiment, the two or more surfactant layers having distinct compositions may be configured to complement one another in order to provide enhanced effects. For example, in an embodiment where two or more surfactant layers having different dissolution rates are present, the fastest dissolving layer is formulated to reduce surface tension in order to allow the solution to penetrate synthetic fibers on a microscopic level to continuously wet the entire surface of the fibers. The next layer is then capable of dissolving and loosening dirt on the entire wetted surface of the fibers instead of just cleaning in spots, as would occur when the surface of the fibers was wetted discontinuously.

Wear Layer

As shown in FIG. 1A, in an embodiment, the wear layer is a layer comprising at least one water soluble polymer and optionally, one or more additives such as waxes, oils, fillers, matting agents, gloss improving agents, self-leveling agents, ink absorbing agents, or combinations therein. In some embodiments, the dissolvable surfactant composite may include a single wear layer while in alternative embodiments, such as the embodiment depicted in FIG. 4, the dissolvable surfactant composite may comprise two or more wear layers.

Exemplary suitable soluble polymers include synthetic polymers such as pullulan and/or natural polymers such as sodium alginate, starches, polysaccharides, polyethylene oxide, all hydrophobic polymers and derivatives, cellulose acetate, wheat proteins, and hyaluronic acid, or mixtures therein. In an embodiment, a preferred synthetic soluble polymer is pullulan, polyvinyl alcohol, or a combination thereof. A preferred natural polymer is alginate. In one embodiment, the soluble polymer is entirely a natural polymer and does not include any synthetic polymer components.

In some aspects, the wear layer may be configured to provide strength and stability to the dissolvable surfactant composite. For example, the wear layer may improve tensile strength, act as a barrier to partially block moisture, or eliminate tackiness. The wear layer may be configured to allow for safe and stable storage of the dissolvable surfactant composite, even when additional packaging is not used. For example, the wear layer may be configured to reduce or eliminate tackiness so that the dissolvable surfactant composite may be stored and handled without sticking to itself or to surrounding objects. Further, the dissolvable surfactant composite may have no immediate wet tack if someone touches it with wet hands, and also may keep the ingredients from absorbing moisture in an open non-sealed package.

In some aspects, the wear layer may be configured to provide an optimal printing surface for inks, dyes, pigments, etc. In particular, the wear layer may be configured to allow for the printing of crisp, clear images, lines, and points while resisting bleeding or migration of the printed ink.

In some embodiments, the wear layer may include an additive configured to interact with an ink, such that the additive assists in binding or adsorption of the ink to the wear layer and prevents migration. For example, in an embodiment comprising an ink which dries by absorption, such as an offset ink that does not contain a drier, an oleophilic additive may be included in the wear layer, that is configured to readily absorb the oil in an offset ink. In an alternative embodiment comprising a water-based ink, the wear layer may be formulated to be somewhat hydrophilic so that the ink may absorb readily, rather than beading up and holding its shape after printing. In yet another exemplary embodiment, wherein a solvent based ink is used, the wear layer may be formulated to preserve its integrity and resist degradation and deformation when exposed to alcohol or other solvents.

In some embodiments, the wear layer may include additional additives such as optical brighteners; UV absorbers; colorants of all types such as pigments or dyes including colors that turn colorless upon drying or heating; fluorescent or reflective components such as mica flakes, polyester and aluminum flakes; waxes of all types; plasticizers of all types, such as glycerin, glycols, etc.; anti-stat and static ingredients to repel a static charge or to keep a static charge; magnetic matter to accept a magnetic ingredient; fragrances of all types; a bittering agent as a deterrent for ingestion, such as accidental ingestion by children; gloss promoting ingredients or matte promoting ingredients to adjust surface gloss; reflective ingredients for light, heat, or UV, such as, for example, glass beads to be light reflective; photochromic and thermochromic ingredients; glow in the dark ingredients; plant based ingredients and non-plant based ingredients; and any combination therein. A total amount of additives may be included in an amount ranging from 0.1% to 90%, more preferably from 1% to 25%, or most preferably from 1% to 15% by weight of the wear layer.

While the wear layer may be configured to partially block moisture, in order to prevent spontaneous degradation of the surfactant layer caused by a humid environment, the wear layer may also be configured to dissolve readily in cold, room temperature, warm, and/or hot water. For example, the wear layer may be configured to dissolve within 1 to 60 seconds, preferably within 1 to 30 seconds, and most preferably within 1 to 10 seconds when placed in water or other aqueous solutions. In some embodiments, dissolution within the described time ranges may occur in water or aqueous solution within the temperature range of about 5° C. to about 37° C., preferably within the temperature range of about 5° C. to about 26° C., and most preferably within the temperature range of about 10° C. to about 21° C. In some embodiments, no stirring, agitation, or physical friction is necessary in order for the wear layer to dissolve within the time and temperature ranges described above.

Image Layer

In some aspects, the image layer may be a layer of ink, dye, pigment or the like which is selectively printed to form any indicia such as images, pictures, messages, slogans, logos, numbers, promotions, etc.

In some aspects, the image layer may be disposed on the wear layer. In such embodiments, the ink of the image layer may cover an entire surface of the wear layer, while in other embodiments, the ink of the image layer may only cover a part of the wear layer. In some embodiments, the image layer may be completely or partly separated from contact with a surfactant layer by an intervening wear layer. Such a configuration may be advantageous in that it may prevent or inhibit ink bleeding or migration caused by contact with the surfactant layer and may therefore provide improved image quality and a more stable product.

Suitable inks to be used in the image layer include solvent based, water based, oil based, UV, and EB inks. Any suitable oxidative ink or evaporative ink may be selected based on its compatibility with the wear layer and/or the surfactant layer. In some aspects, the ink of the printed image layer may be selected to interact with the wear layer, or more specifically, the soluble polymer or an additive of the wear layer, so as to provide clear images and so that ink migration is minimized or eliminated. In some embodiments, the ink may be configured to stably absorb into the wear layer, while in other embodiments the ink may be adapted to chemically bond or adsorb to a component of the wear layer.

While the ink may impart color to the resulting aqueous solution after the dissolvable surfactant composite is dissolved, in some embodiments, the ink of the printed image layer is configured to avoid staining or discoloration of surfaces such as floors, windows, walls, and furniture. In some embodiments, the ink may be encapsulated in microcapsules such that it may be visualized and provide color to an aqueous solution but will not interact with the surface of a solid object so as to stain or discolor the object. In other embodiments, the ink may be configured to degrade over time, so that it provides temporary color, but will not provide persistent staining or discoloration to objects which it contacts. Finally, in still other embodiments, the ink may be configured to interact with a component, or degradant, of another layer such that it is degraded or decomposed. For example, such an ink may remain stable while the dissolvable surfactant composite is in a dry state because the ink is separated from the degradant. However, when the composite is dissolved, the degradant and ink may interact in solution to decompose the ink.

Additional Layers

In some aspects, the dissolvable surfactant composite may contain one or more additional layers other than the at least one surfactant layer, the wear layer and the image layer. Additional layers according to the present technology may include layers such as, for example, an adhesive layer, a magnetic layer, a protective layer, a strengthening layer, a fragrance layer, a bleach layer, a tanning layer, a conditioning layer, a sunscreen layer, an antiscuff layer, an oil infused layer for wood conditioning, a pumice layer for scrubbing.

In some aspects, the one or more additional layers may be disposed in any location on or between the at least one surfactant layer, the wear layer and the image layer. For example, a dissolvable surfactant composite according to the present technology may include a wear layer having a first surface and a second opposing surface, with a surfactant layer disposed on the first surface of the wear layer, and an image layer disposed on the second surface. An adhesive layer may be further included. In an embodiment, the adhesive layer may be disposed on an outer surface of the surfactant layer. Accordingly, in such an embodiment, the image layer may be on an opposite side of the dissolvable surfactant composite from the adhesive layer. Such an embodiment may be useful for applications such as stickers, signs, and posters, where it is desired to attach one side of the composite to a surface using the adhesive, in order to display an image visible to a user, a customer, or general passersby on the opposing, outward facing side of the composite. In an alternative exemplary embodiment, the adhesive layer may be disposed on an outer surface of the image layer, such that the image layer may be on the same side of the dissolvable surfactant composite as the adhesive layer. In a case where the adhesive layer is transparent, such an embodiment may be useful for applications such as a sign, poster, or advertisement to be applied on the inside surface of a window, for viewing by outside passersby.

Exemplary Structure of Dissolvable Surfactant Composite

As shown in FIG. 1A, in an exemplary embodiment, the dissolvable surfactant composite 100 according to the present technology may include one surfactant layer 120, a wear layer 130, and an image layer 140. Each layer may have a first surface and an opposing second surface. As depicted in FIG. 1A, in an embodiment, the first surface of the surfactant layer 120 may form an outer layer and may not be attached to any other layer. The second surface of the surfactant layer may be attached to and disposed on the first surface of the wear layer 130. Finally, the first surface of the image layer 140 may be attached to and disposed on the second surface of the wear layer 130, such that the wear layer 130 may be sandwiched between the image layer 140 and the surfactant layer 120. As depicted in FIG. 1A, the ink of the image layer 140 may cover all or only part of the second surface of the wear layer 130, such that an image 150 is formed by the ink pattern, as shown in FIG. 1B.

Figure 3:
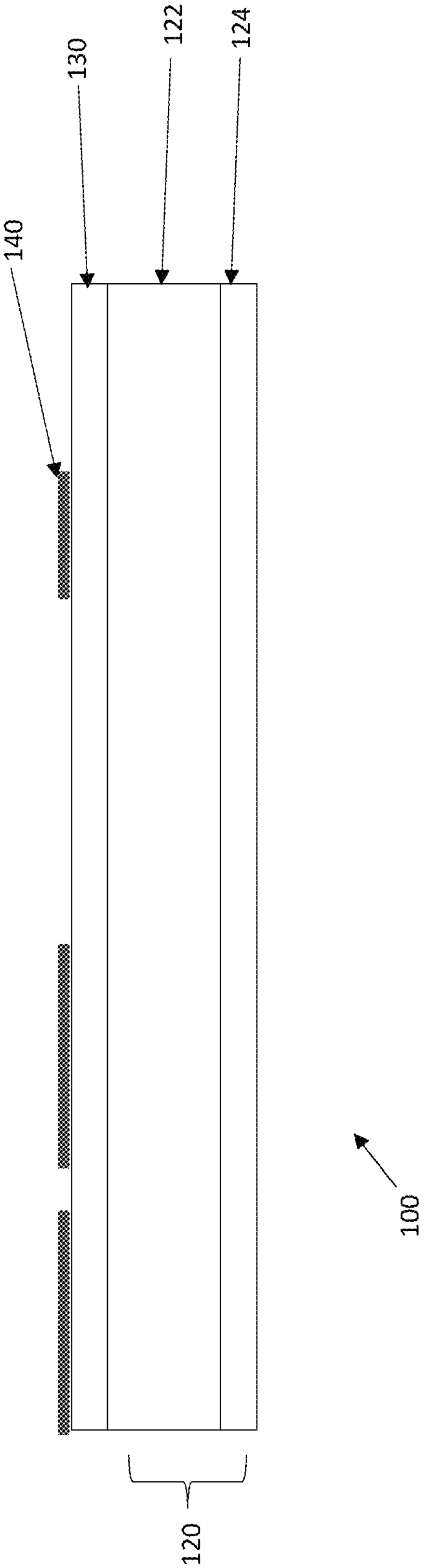
FIG. 3 depicts a cross-sectional view of a dissolvable surfactant composite according to aspects of the present technology.

As shown in FIGS. 2-3, in some embodiments, multiple surfactant layers 120 may be included, each having a distinct composition. For example, the dissolvable surfactant composite may have a first surfactant layer 122 and a second surfactant layer 124. In an exemplary embodiment, the second surfactant layer 124 may be attached to and disposed on a first surface of the first surfactant layer 122. In an embodiment, the first surfactant layer 122 may be formulated to have a floor washing capability after dissolution and may include ingredients such as pumice particles or other abrasives. The second surfactant layer 124 may be formulated to have a drain or pipe cleaning capability and may include ingredients such as microbial ingredients designed to aid in break down and dissolution of waste that may foul pipes and drains. However, FIGS. 2-3 are merely exemplary and alternative and additional surfactant layers and compositions are contemplated.

Figure 4:
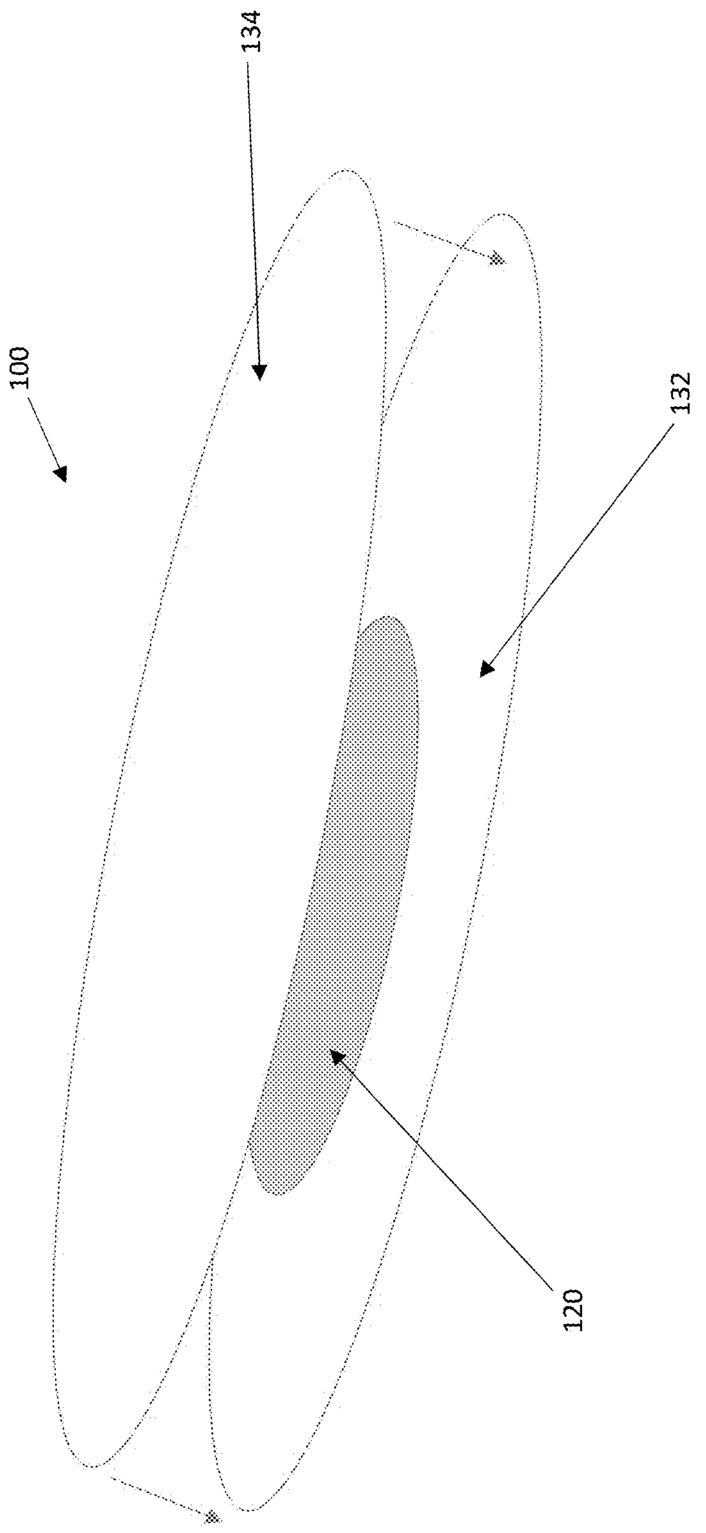
FIG. 4 depicts an exploded view of a dissolvable surfactant composite according to aspects of the present technology.

As shown in FIG. 4, in some embodiments, multiple iterations of one or more of the layers described herein may be included. FIG. 4 is an exploded view of a dissolvable surfactant composite 100 according to aspects of the present technology, which comprises a surfactant layer 120 having a first surface and a second opposing surface, a first wear layer 132 disposed on the first surface of the surfactant layer, and a second wear layer 134 disposed on the second surface of the surfactant layer. In such an embodiment, the surfactant layer 120 may have the same area as the surrounding first and second wear layers 132, 134 and therefore may extend up to and flush with the peripheral edges of the wear layers 132, 134. However, in other embodiments, such as depicted in FIG. 4, the surfactant layer 120 may have a smaller area than the wear layers 132, 134 and thus may be sealed within and between the two wear layers 132, 134, such that it is protected from and does not contact the outside environment. In such an embodiment, the first and second wear layers 132, 134 may act in place conventional disposable packaging to maintain the structural and chemical stability of the surfactant layer 120 prior to dissolution.

Method of Producing Dissolvable Surfactant Composite

A dissolvable surfactant composite according to the present technology may be produced in a layer-by-layer fashion. For example, either a steel belt or a substrate, known together as a cast substrate, may be used as a surface upon which to form a first layer. The cast substrate may be a polyester, polypropylene, a silicone release liner, another type of release liner, other plastic, or the like. The cast substrate does not form part of the dissolvable surfactant composite, but merely provides a surface on which to form one or more layers of the composite.

Accordingly, at least one layer may be printed, cast or coated onto the cast substrate using any suitable method known in the art such as knife coating, reverse roll coating, spray coating, slot die coating, various other coating methods, gravure or microgravure coating, offset coating, hot melt coating, curtain coating, extruding, coextruding, kiss coating, transfer roll coating, rotary screen, flat screen, hot stamped, cold stamped, thermal transferred, flexographic printed or coated, cold laminated or hot laminated. Any of the layers formed directly on the cast substrate could be a film forming or non-film forming layer that may be dried in between formation of subsequent layers or may have another layer applied while still wet. These layers may impart multiple characteristics to subsequent other layers. Layers formed by these methods may include at least one surfactant layer and a wear layer.

A wear layer formed by the described coating or casting method may be formulated to accept printing of different ink types on a surface of this layer. Exemplary printing techniques may include, but are not limited to: water-based ink jet printing; water-based offset printing; water-based flexography printing; water-based screen printing; water-based gravure printing; solvent-based ink jet printing; solvent-based offset printing; solvent based flexography printing; solvent-based screen printing; solvent-based gravure printing; UV or EB-based ink jet printing; UV or EB-based offset printing; UV or EB-based flexography printing; UV or EB-based screen printing; UV or EB-based gravure printing; oil-based ink jet printing; oil-based offset printing; oil-based flexography printing; oil-based screen printing; oil-based gravure printing; all toner-based printing; all ribbon and dot matrix printing; all marking types using hand markers of all types; all spray coatings, airbrush and curtain coatings; embossing, debossing, kiss cut, dipping etc.; laser engraved or marked, plotter cut or 3D printing; heat sealing; hot stamping; cold laminating; hot laminating; adhesive laminating; and etching.

Capability of the Dissolvable Surfactant Composite

A dissolvable surfactant composite according to the present technology may be configured to have at least a dual capability. That is, the dissolvable surfactant composite is configured to have a first prior to dissolution and at least a second capability after dissolution in water. In some embodiments, the dissolvable surfactant composite is adapted to function as a single-use image bearing article prior to dissolution and to function as a cleaning agent after dissolution in water.

The dissolvable surfactant composite of the present technology may be configured to provide various first functionalities, including but not limited to: cards, such as greeting cards, sampler cards, holiday cards, and postcards; posters; boxes; price channel markings; hangtags; receipt paper; labels; decals; temporary tattoos or patches; folders; copy paper; packaging; tapes; produce labels; one time use sponges; floor cleaning pads; alcohol wipes and other wipes for cleaning or disinfecting including glass, furniture, and cosmetic applications; dryer sheets; sink dishwashing sheets; dishwasher sheets, bath sheets; bubble batch sheets; instruction manuals; and clothing tags.

The dissolvable surfactant composite of the present technology may be configured to provide various second functionalities, including but not limited to: hand soap and body wash; shampoo and conditioner; shaving cream and face conditioner; skin conditioner; lotions and moisturizers; deodorant; antiperspirant; antibiotic creams or solutions;

bubble bath or other bath solutions; scented solutions, such as for bathing; odor reducing solutions, such as for bathing humans or animals; cosmetic compositions; odor reducing solutions for inanimate objects such as sinks, toilets, or dishwashers; floor cleaners; window cleaners; carpet cleaners; dishwashing solution; pipe or drain cleaners.

The dissolvable surfactant composite of the present technology may be capable of fast and easy dissolution. For example, the dissolvable surfactant composite may dissolve within 1 to 60 seconds, preferably within 1 to 30 seconds, and most preferably within 1 to 10 seconds when placed in water. In some embodiments, dissolution within the described time ranges may occur in water within the temperature range of about 5° C. to about 37° C., preferably within the temperature range of about 5° C. to about 26° C., and most preferably within the temperature range of about 10° C. to about 21° C. In some embodiments, no stirring, agitation, or physical friction is necessary in order for the dissolvable surfactant composite to dissolve within the time and temperature ranges described above.

It will be understood by those skilled in the art that, although the subject invention has been described above in relation to embodiments thereof variations and modifications can be effected in these preferred embodiments without departing from the scope and spirit of the invention.

Unless otherwise stated, the foregoing, alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A dissolvable surfactant composite, comprising:

a wear layer comprising a water soluble polymer, having a first surface and an opposing second surface;

a porous surfactant layer comprising a surfactant and a film former, disposed on the first surface of the wear layer; and an image layer comprising an ink, dye, or pigment, disposed on the second surface of the wear layer, wherein the wear layer has a thickness of less than about 10 microns and does not include a fragrance, and wherein the dissolvable surfactant composite is configured to dissolve within 1 to 60 seconds when placed in water or other aqueous solution, wherein no stirring, agitation, or physical friction is necessary in order for the dissolvable surfactant composite to dissolve.

2. The dissolvable surfactant composite of claim 1, wherein the porous surfactant layer has a porosity within a range of 5% to about 75%.

3. The dissolvable surfactant composite of claim 1, wherein the surfactant comprises an anionic surfactant and a nonionic surfactant.

4. The dissolvable surfactant composite of claim 1, wherein the surfactant is included in an amount of about 30% to about 80% by weight of the surfactant layer.

5. The dissolvable surfactant composite of claim 1, wherein the water soluble polymer is selected from the group consisting of pullulan, polyvinyl alcohol, sodium alginate, starches, polysaccharides, polyethylene oxide, cellulose acetate, wheat proteins, hyaluronic acid, and any mixture therein.

6. The dissolvable surfactant composite of claim 5, wherein the water soluble polymer comprises a synthetic polymer selected from the group consisting of pullulan, polyvinyl alcohol, and a combination thereof.

7. The dissolvable surfactant composite of claim 5, wherein the water soluble polymer consists of a natural polymer and does not include any synthetic polymer components.

8. The dissolvable surfactant composite of claim 7, wherein the natural polymer comprises alginate.

9. The dissolvable surfactant composite of claim 1, wherein the wear layer is configured to dissolve within 1 to 60 seconds when placed in water or other aqueous solution, wherein no stirring, agitation, or physical friction is necessary in order for the wear layer to dissolve.

10. The dissolvable surfactant composite of claim 1, wherein the surfactant layer comprises two or more surfactant layers, each having a distinct composition.

* * * * *